Patented Apr. 12, 1949

2,467,147

UNITED STATES PATENT OFFICE 2,467,147

LOW-TEMPERATURE LUBRICANT

Arnold J. Morway, Clark Township, Union County, and John C. Zimmer, Union, N. J., assignors to Standard Oil Development Company, a corporation of Delaware No Drawing. Application March 22, 1945, Serial No. 584,260

9 Claims. (Cl. 252—29)

This invention relates to lubricants, and in particular to lubricants of grease consistency suitable for low temperature services.

In the past, greases have been extensively prepared by compounding certain soaps and petroleum distillates. The low temperature greases have been prepared mainly from the lower viscosity petroleum distillates. Such compositions, however, are not suited for the lubrication of systems such as aeroplane, cameras and meteorological equipment parts in which high ground temperatures as occur in tropical regions may cause the loss by volatility of some of the hydrocarbon constituents. Volatility may in fact cause, after a period of use at the high temperatures, the loss of the low temperature characteristics of the composition due to increasing soap concentration. This effect, moreover, may be coupled with a fire hazard occurring during the preparation of the composition. The use of the lower petroleum fractions is therefore disadvantageous in grease compositions having to withstand substantial temperature variations from low temperature conditions. The present invention is concerned with a grease composition particularly suitable for lubrication over a wide range of temperatures such as from about —90 F. to about 200° F.

It has been found that the esters of the aliphatic dibasic acids, particularly those esters in which the esterifying radical is a branched chain alkyl, are not only chemically stable but also have such unusual properties as low vapor pressures under atmospheric conditions, high viscosity indices and low pour points. Compounds having similar characteristics are the halogenated aryl hydrocarbons. These groups of compounds, it has now been found, when compounded with a structure black in an amount between 5% and 25% by weight, produce compositions of viscid nature and of grease-like structure suitable for the lubrication of bearings at temperatures from about —90° F. to about 200° F. without loss of composition. The compositions also have relatively high load-carrying capacities as a result of the combined effects of the esters and the structure blacks. The compositions are also water-resistant and do not appear to have melting points, presumably because of their content of carbon black which is not affected by heat. In addition also the oil separation and evaporation characteristics are markedly good and fall within the strict requirements of the Army-Navy Aeronautical Specifications for Low Temperature Greases (AN–G–3a specification).

The esters which may be used in making the grease compositions of the present invention have the general formula $COOR_1$—R—$COOR_2$, where R is a bivalent aliphatic hydrocarbon radical such as methylene, polymethylene, ethylidene, propylidene, methyl dimethylene, butenylidene and the like; $R_1$ and $R_2$ are hydrocarbon radicals such as branched chain alkyl, alkaryl and cyclo alkyl radicals of which secondary butyl, benzyl, cyclo hexanol and secondary octyl phenyl are representative. These esters may contain additional constituents or functional groups such as Cl, Br, $NH_2$, NHR, $NR_1R_2$, CHO, CO, SH, SR, RSSR, ROR, ROMetal.

Particular esters advantageous in this invention are, therefore, the esters of aliphatic dibasic acids, particulrly those esters in which the esterifying radical is a branched chain alkyl radical. These esters possess unusually high boiling points and resulting low vapor pressures at ambient temperatures, high viscosity indices, or low viscosity-temperature coefficient, extremely low pour points, and are relatively stable chemically. Among the aliphatic dicarboxylic acids suitable for the preparation of the esters used in making the grease compositions of the present invention there may be particularly mentioned malonic, succinic, isosuccinic, glutaric, ethyl malonic, pyro tartaric, adipic, pimelic, suberic, azelaic and sebacic acids. However, any acid or mixture of acids is advantageous which has the general formula HOOC(R)COOH, in which R is a bivalent aliphatic radical. Thus, the synthetic acids produced by polymerization or dimerization of unsaturated fatty acids or their esters may be advantageously used. Also, citric acid and some of the acids derived from the lower molecular weight aromatics, such as benzoic and phthalic acids and their alkylated derivatives, have also been advantageous.

Typical esters together with some of their more significant properties are given in the following table:

Table

| Name of Ester | Centistokes Viscosity at— | | | Slope on ASTM Viscosity Temp-Chart for the Interval of 210° F. to −40° F. | Visc. Index | Flash Point | Pour Point, °F. | Approx. Boiling Point °F. at Atmospheric Pressure |
|---|---|---|---|---|---|---|---|---|
| | 210° F. | 100° F. | −40° F. | | | | | |
| Di Sec. Butyl Sebacate | 2.09 | 6.42 | 320 | 0.752 | 136 | 355 | −90 | 650 |
| Di-2-ethylhexyl Sebacate | 3.31 | 12.64 | 1532 | 0.707 | 152 | 430 | −90 | 760 |
| Di-undecanyl Sebacate | 4.66 | 22.83 | 8000 | 0.716 | 138.5 | | −85 | |
| Di-2-ethylhexyl alkylated Succinate | 5.56 | 42.72 | [1] 200,000 | 0.812 | 68.5 | | −45 | |
| Di-2-ethylhexyl Azalate | 3.05 | 11.25 | 1200 | 0.729 | 147 | 410 | −40 | 750 |

[1] Extrapolated from the 100 and 210° F. values.

It is readily apparent from the foregoing data that esters of this type possess ideal properties with regard to pour point, viscosity and viscosity-temperature characteristics, flash and boiling points necessary to minimize evaporation, making valuable lubricants for use as low temperature greases.

The esters may be prepared by any of the well-known methods for the preparation of esters. Thus, one suitable method consists of reacting the alcohol with the acid at elevated temperatures in the presence of an esterification catalyst such as sulfuric acid, sulfosalicylic acid, etc. The reaction is facilitated by a continuous removal of water formed during the reaction by azeotropic distillation with a solvent such as benzene, toluene, etc., or by passing inert gas through the reaction mixture to remove water of reaction. The product is washed with dilute alkali to remove the catalyst and any traces of unreacted acid and if necessary is heated under reduced pressure with or without blowing with an inert gas to remove any unreacted alcohol or other low boiling material. If necessary, the product can be clay-treated, and it is desirable, although not absolutely necessary, that the finished ester have a neutralization number not higher than about 0.2 mg. KOH per gram of ester to obtain suitable stability to oxidation, since free acids left in the finished material can catalyze oxidation of the product, particularly in the presence of materials such as copper or brass at elevated temperatures.

The carbon blacks which have been found suitable for use in the present invention are those commonly termed the structure blacks. The term "structure black" has particular reference to those carbon blacks which have an abnormally high structure index as defined in an article by Sweitzer and Goodrich in "Rubber Age" for August, 1944, page 469 and especially page 470. This index is a measure of the oil absorption capacity of carbon black. Acetylene black shows a very high index, about 300, as compared with 100 for ordinary channel blacks. Some of the specially processed channel blacks have abnormally high structure indexes as shown in the Wiegand article and are also useful. Carbon blacks of high structure index form smooth colloidal type greases which are highly stable against lubricant separation. These carbon blacks, well known in the ink and paint industries for their thixotropic or bodying effect in mineral oil and similar liquids, are characterized by an apparent reticulate structure under the recently developed high-power electron microscope. These carbon blacks also form colloidal gels in a variety of organic liquids, including the liquid petroleum distillates above the naphtha range, and impart to the liquids a thickening effect similar to that of the grease-forming soaps when compounded with mineral lubricating oils. Examples of this class of carbon blacks are those obtained by the thermal decomposition of unsaturated hydrocarbons such as acetylene, or produced in the electric arc treatment of petroleum fractions. Other suitable carbon blacks are the various channel blacks prepared from natural gas.

The structure blacks suitable for use in the present invention differ from the carbon blacks previously used as fillers in the preparation of lubricants. Carbon blacks previously used as fillers include graphite and the relatively high particle size thermal blacks such as petroleum coke. The distinction between the carbon blacks previously employed in the lubrication art and the structure blacks employed in the present invention is brought out by centrifuging compositions prepared from the two types of carbon blacks in ester liquids. When the two types of compositions were centrifuged at 3000 R. P. M. for 24 hours, no settling occurred in the case of the structure blacks but only a slight serum (0.2% to 0.5%) was noted on the surface. With graphite and other relatively large size particle blacks in the esters, most of the blacks settled out at the bottom of the centrifuge, leaving clean oil in the upper layer. In the case of the other compositions, appreciable separation occurred.

The effect of the structure blacks and grease-forming soaps in the ester liquids of the present invention is shown by the following comparison of data:

| Grease | ASTM Penetration Values | | | |
|---|---|---|---|---|
| | Unworked | 60 Stokes | 1920 Stokes | 10,000 Stokes |
| Esters+Normal Lubricating Grease Soaps | 300 | 330 | [1] 360 | [1] 380 |
| Esters + Structure Carbon Black | 300 | 300 | 300 | 300 |

[1] Semi-fluid.

These data show the stability of the greases to mechanical working, the products being worked under 10,000 stokes in a mechanical ASTM worker.

Typical compositions according to the invention consist of blends of a colloidal carbon black, such as a structure black or a very fine particle ink black, with a petroleum-soluble liquid oxygenated hydrocarbon material. As a specific example, 10% of a structure black was blended with 90% secondary butyl sebacate by working the carbon black into the esters in a regular wall scraping grease kettle under normal temperature conditions. The product thus obtained was a stable solid lubricant having a penetration of 275-300 ASTM at 77° F. The product gave excellent torque values and a very flat temperature vs. plasticity number curve. The torque values were also very low when run on the test described in an AN-G-3a specifications.

As another specific example, 18% carbon black (medium surface area ink black) was blended with 82% 2-ethyl hexyl sebacate under similar conditions to those of the previous illustrative composition. However, due to the difficulty of completely dispersing this small particle size carbon black, high viscosity milling may be more advantageously employed in the blending. The product so prepared had an ASTM penetration in the range of 275 to 300 at 77° F. and excellent low temperature properties.

Also, extreme pressure agents may be added to improve the load-carrying capacities of the compositions. Among the more suitable addition agents in this connection are the sulfurized, chlorinated or sulfo chlorinated mineral oil, fatty oil, esters, olefins, diolefins, amines, etc. Also sulfides, disulfides, xanthates, carbamates, polysulfides, xanthate polysulfides, their metal derivatives, chloro xanthates, chloro wax-sulfur polymers, chlorokerosene, "Parapoid," chloro mercaptans, mercaptides, etc., may be employed with corrosion inhibitors such as amine condensation products, amines, alkyanol amines, ammonium bases or onium compounds, etc.

As a thickening agent may be employed such an ester or a glyceride polymer as a dilinoleate ester of alcohol, glycol or glycerine, an alpha acrylic or methacrylic acid ester polymer or an ester polymer of a polybasic acid. The use of polybutene in combination with a methacrylic acid ester polymer is particularly advantageous. Rubber latex with or without oxidation inhibitor, oil solution of natural or synthetic rubber, may also be employed in the composition. Also, corrosion preventatives such as a mixture of degras and metallic sulfonates may be added to impart further improvement in, and extended desirable properties to, the composition.

Although lead soaps are the preferred type of buffer or cushioning agent for use in the compound, other metal soap, metal salts, sulfonates, phenates, phenol sulfides, etc., may be employed including thiophosphates, reaction products of sulfonates with $P_4S_3$, etc. Antioxidants may also be included, for example, aliphatic amines, alkyaryl amines, the reaction products of amines and aldehydes, aminated phenol formaldehyde reaction products, diamines, alkylated phenols or cresols, amino phenols, etc.

What is claimed is:

1. A lubricating grease composition consisting essentially of an oily ester of the general formula $COOR_1$—R—$COOR_2$ wherein R is a bivalent aliphatic hydrocarbon radical and $R_1$ and $R_2$ are radicals selected from the group which consists of branched chain alkyl, alkaryl and cyclo alkyl hydrocarbon and substituted hydrocarbon radicals, said ester being thickened to a grease consistency of colloidal structure with 5 to 25% by weight, based on the total composition, of a carbon black of abnormally high structure index as determined by high oil absorption and oil thickening capacity.

2. A lubricant according to claim 1 in which the structure black is acetylene black.

3. A lubricant consisting essentially of an ester of a sebacic acid and 5 to 25% by weight of an abnormally high structure index carbon black capable of forming a colloidal type grease structure with said ester.

4. A lubricant consisting essentially of an ester of azelaic acid and 5 to 25% by weight of an abnormally high structure index carbon black capable of forming a colloidal type grease structure with said ester.

5. A lubricant consisting essentially of an ester of adipic acid and 5 to 25% by weight of an abnormally high structure index carbon black capable of forming a colloidal type grease structure with said ester.

6. An improved lubricating composition consisting essentially of an ester of an aliphatic dibasic acid and an alcohol of branched chain structure, 5 to 25% by weight of an abnormally high structure index carbon black and a chemically inert acrylic polyester thickener.

7. An improved lubricating composition consisting essentially of an ester of a sebacic acid and an alcohol of branched chain structure, 5 to 25% by weight of an abnormally high structure index carbon black and a chemically inert acrylate polyester thickener.

8. An improved lubricating composition consisting essentially of an ester of azelaic acid and an alcohol of branched chain structure, 5 to 25% by weight of an abnormally high structure index carbon black and a chemically inert acrylate polyester thickener.

9. An improved lubricating composition consisting essentially of an ester of adipic acid and an alcohol of branched chain structure, 5 to 25% by weight of an abnormally high structure index carbon black and a chemically inert acrylate polyester thickener.

ARNOLD J. MORWAY.
JOHN C. ZIMMER.

REFERENCES CITED

The following references are of record in the file of this patent:

UNITED STATES PATENTS

| Number | Name | Date |
|---|---|---|
| 1,590,800 | Becker | June 29, 1936 |
| 2,091,627 | Bruson | Aug. 31, 1937 |
| 2,104,408 | Wiezevich | Jan. 4, 1938 |
| 2,134,736 | Reuter | Nov. 1, 1938 |
| 2,349,058 | Swenson | May 16, 1944 |
| 2,356,367 | Wright | Aug. 22, 1944 |
| 2,411,150 | Evans | Nov. 19, 1946 |
| 2,417,281 | Wasson | Mar. 11, 1947 |
| 2,436,347 | Zimmer et al. | Feb. 17, 1948 |

FOREIGN PATENTS

| Number | Country | Date |
|---|---|---|
| 17,288 | Great Britain | 1913 |
| 500,222 | Great Britain | Feb. 6, 1939 |

OTHER REFERENCES

"Uses and Applications of Chemicals and Related Materials," Gregory, Reinhold Publishing Co., 1944, page 148.